United States Patent

[11] 3,580,280

| [72] | Inventor | Robert D. Reis<br>Hingham, Mass. |
|---|---|---|
| [21] | Appl. No. | 865,458 |
| [22] | Filed | Oct. 10, 1969 |
| [45] | Patented | May 25, 1971 |
| [73] | Assignee | United Electric Controls Company<br>Watertown, Mass. |

[54] PISTON VALVE
11 Claims, 6 Drawing Figs.

[52] U.S. Cl. .................................................. 137/596.14,
137/625.66, 137/625.68, 91/412
[51] Int. Cl. ..................................................... F16k 11/10,
F15b 11/00
[50] Field of Search............................................ 137/596.15,
625.63, 625.67, 625.68, 596.14; 251/325, 596.16,
596.18, 625.66; 91/412, 461, 189, 413

[56] References Cited
UNITED STATES PATENTS

| 2,646,820 | 7/1953 | McLeod | 137/596.15 |
| 2,650,609 | 9/1953 | Herbst | 137/596.14 |
| 3,175,581 | 3/1965 | Brandenberg et al | 137/596.15 |
| 3,196,896 | 7/1965 | Leutenegger | 137/596.15X |
| 3,232,316 | 2/1966 | Carlisle | 137/596.15 |

Primary Examiner—M. Cary Nelson
Assistant Examiner—Robert J. Miller
Attorney—Roberts, Cushman & Grover ABSTRACT: A valve block containing axially aligned chambers one of which contains a port midway between its ends and the other three ports, two at one end and one at the other. A piston is mounted in the chambers for movement axially therein. The piston has a head to which pressure is adapted to be supplied through one of the ports to shift the piston axially and a stem containing ports which in one position of the piston permits flow of pressure fluid through the valve and in the other position blocks flow through the valve. In conjunction two such valves and a pilot valve connected thereto so that pressure supplied to the head of one valve, shifts the piston therein from a normally closed to an open position, which, in turn, supplies pressure to the head of the other valve which is normally open to shift the piston therein to a closed position, provide for switching the pressure from a source of pressure to one or the other of two activities.

Patented May 25, 1971     3,580,280

Inventor
Robert D. Reis
by Roberts, Cushman & Grover
Attys

PISTON VALVE

BACKGROUND OF THE INVENTION

Piston-type valves of various kinds and construction are commercially available, however, for the most part, such valves are of intricate design and require extensive and costly machining. The purpose of this invention is to provide an improved piston valve of such simple design that it can be manufactured without extensive machining and without maintaining close tolerances. A further object is to provide piston valves especially adapted for use in conjunction with a common pilot valve to enable switching pressure in a pressurized system from one activity to another.

SUMMARY

As herein illustrated the valve comprises a valve block containing concentrically arranged chambers with an annular shoulder at the proximal ends of the chambers. The distal end of one chamber is closed and that of the other open. There are three ports one adjacent the distal end and the other two adjacent the proximal end of said one chamber and a single port intermediate the proximal and distal ends of the other chamber. A piston is supported in the chambers for axial movement relative to the ports and embodies a stem occupying said other chamber and extending therefrom into said one chamber and a head situated in said one chamber, said head in conjunction with the wall of said one chamber confining between it and the distal end of said one chamber pressure fluid supplied to the one chamber through the port at its distal end. There are axially spaced bypass passages in the stem, so located that when the head engages the distal end of the one chamber one of the bypass passages is situated opposite the ports at the proximal end of the one chamber and the other is situated opposite the port intermediate the ends of said other chamber and connects the latter to the atmosphere.

The invention will now be described in greater detail with reference to the accompanying drawing wherein.

Figures 5, 6:
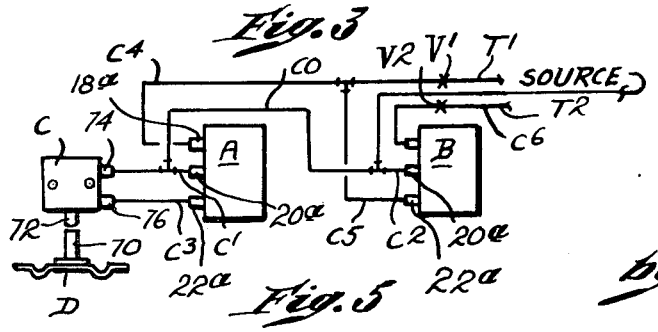

FIG. 5 diametrically shows a pressurized system embodying the two types of valves in conjunction with a pilot valve; and FIG. 6 is an elevation to smaller scale of one of the valve blocks.

Referring to the drawings FIG. 5 there are two switching valves A and B which embody the same principle of operation but which are slightly different in physical makeup; and a switching circuit including a pilot valve C by means of which the valves A & B are alternately opened and closed.

Figure 1:
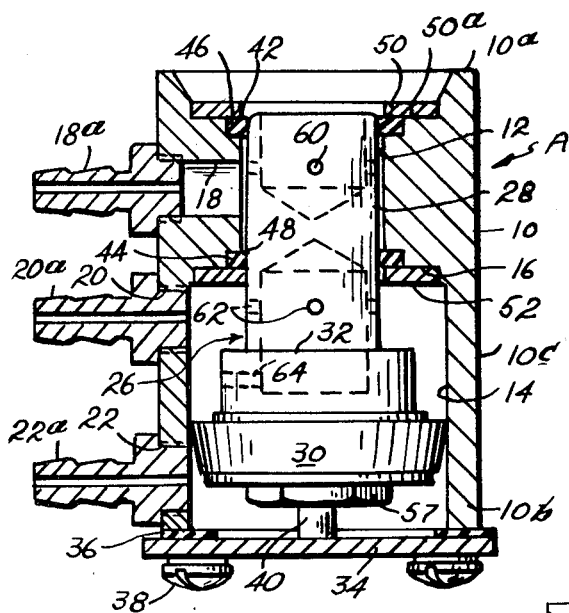
FIG. 1 is a diametrical section through one form of the valve assembly with the piston in the closed position.
Figure 2:
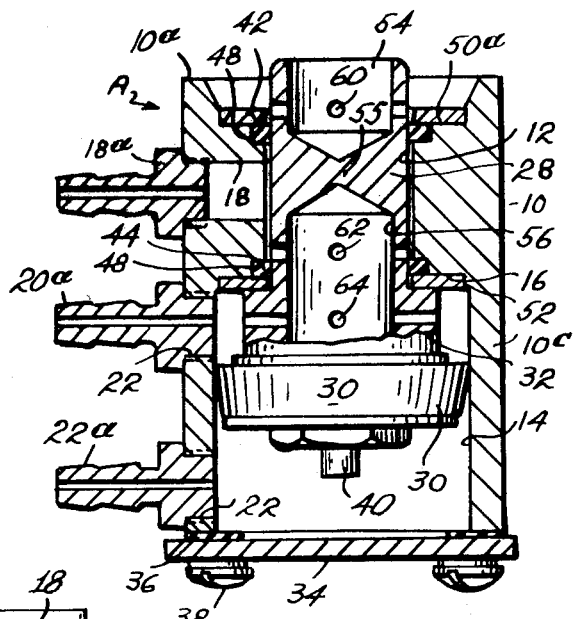
FIG. 2 is a view corresponding to FIG. 1 with the piston in the open position.

Specifically, the switching valve A, FIG. 1 and 2, comprises a valve block 10 having ends 10a and 10b and a sidewall 10c. The block as shown is of circular cross section, however, it may be of any other cross section appropriate to its particular use. The block contains concentric axially aligned chambers 12 and 14 which extend through the opposite ends 10a and 10b of the block. At the proximal ends of the chambers 12 and 14 there is an annular shoulder 16 dividing the chamber 12 from the chamber 14, the latter chamber 14 being larger in diameter than the chamber 12.

Midway between the proximal and distal ends of the chamber 12 there is a port 18 and at the proximal and distal ends of the chamber 14 there are respectively two ports 20 and a single port 22. As manufactured the two ports 20 are situated side by side as illustrated in FIG. 6 and open into the same chamber and for the purpose of describing the invention are considered and hereinafter referred to as a single port. A nipple 18a is threaded into the port 18 and a nipple 22a is threaded into the port 22. A nipple 20a may be threaded into each of the ports 20 and the two may be connected by a Y into the pressure system to be described hereinafter or only one port may be used in which case the other is sealed with a plug.

A piston 26 is mounted in the block within the chambers comprising a stem 28 situated in the chamber 12 and extending from the distal end to its proximal end and from thence into the chamber 14 and a head 30 on the end extending into the chamber 14. At the junction of the stem with the head there is a neck 32 of somewhat larger diameter than the stem and somewhat smaller than the head. The stem corresponds substantially in diameter to the diameter of the chamber 12 there being however a sufficient clearance between the surface of the stem and the wall of the chamber 12 to permit flow of fluid therebetween. The head 30 corresponds substantially in diameter to the inside diameter of the chamber 14 there being a close fit between the head and the chamber so that no flow of fluid is permitted between it and the wall of the chamber 14.

A cover plate 34 is fastened to the open end 10b of the chamber 14 with a sealing washer 36 between it and the end of the block by means of bolts 38 thus providing an end wall to the chamber 14.

The head 30 of the piston is frustoconical in configuration and is arranged in the chamber 14 with the smaller diameter facing the distal end. A stud 40 fixed to the smaller end of the head by engagement with the cover limits movement of the piston toward the distal end of the chamber to a position such that there is always a space between the smaller end of the head and the distal end of the chamber which is in communication with the port 22.

The opposite end of the block 10a is left open and axially spaced sealing rings 42 and 44 are disposed in annular grooves 46 and 48 at the distal and proximal ends of the chamber 12 thus sealing communication between the open end of the block and the interior of the valve chambers 12 and 14. A keeper ring 50 is disposed against the sealing ring 42 to hold it in place and a keeper ring 52 is disposed against the sealing ring 44 to hold it in place. The keeper ring 52 is seated on the shoulder 16 at the junction of the chamber 12 and 14 and the keeper ring 50 is seated against a shoulder 50a provided at the distal end of the chamber 12.

The piston 26 contains at one end an axial passage 54 which extends partway along the stem from the one end toward the other and at the other end an axial passage 56 which extends partway along the stem from the other end toward the one end. The inner ends of the passages 54 and 56 are separated by a wall 55. The outer end of the passage 54 is open and the outer end of the passage 56 is closed by a threaded plug 57 which carries the stud 40. Small diameter radially disposed bypass passages 60 extend from the passage 54 outwardly to the chamber 12 and axially spaced small diameter radially disposed passages 62 and 64 extend from the passage 56 outwardly to the chamber 14. As illustrated there are four of such passages 60, 62 and 64. The axial disposition of the radial passages 60, 62 and 64 are such that when the piston 26 is situated with the head 30 at the distal end of the chamber 14 FIG. 1 the passages 60 are located between the sealing rings 42 and 44 so that the port 18 and chamber 12 are in communication with the atmosphere. At the same time the passages 62 and 64 are located within the chamber 14 between the sealing ring 44 and the head 30 so that the port 20 is in communication with that portion of the chamber 14 located between the sealing ring 44 and the head 30. In this position of the piston no flow can take place between the chambers 12 and 14.

By shifting the piston 26 axially to the position shown in FIG. 2, limited by engagement of the neck 32 with the keeper ring 52 seated against the shoulder 16, the passages 60 as shown in FIG. 2 are moved beyond the sealing ring 42 thus disconnecting the port 18 and chamber 12 from the atmosphere. At the same time the passages 62 and 64 are moved to a position such that they straddle the sealing ring 44 thus connecting the port 20 and chamber 14 to the portion of the chamber 12 surrounding the stem between the sealing rings 42, 44 and hence to the port 18.

Figure 3:
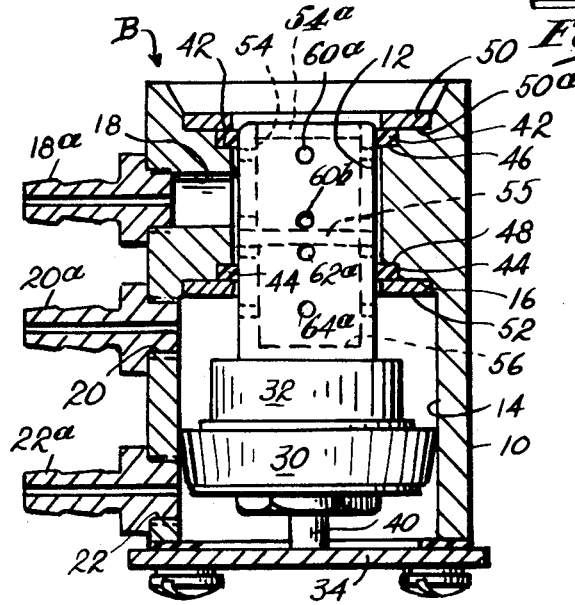
FIG. 3 is a diametrical section of a modified form of the valve shown in FIG. 1 and 2 with the piston in the open position.
Figure 4:
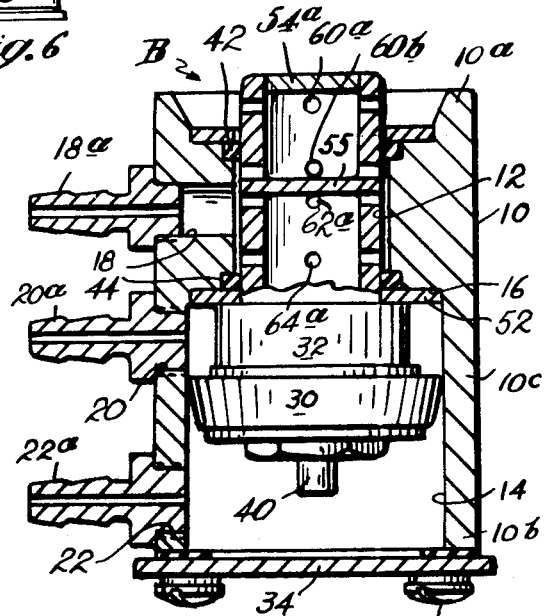
FIG. 4 is a section corresponding to FIG. 3 with the piston in the closed position.

The valve B FIGS. 3 and 4 is like valve A except that the axial passage 54 is closed by a plug 54a and instead of one set of radial passages 60 from the axial passage 54 there are two sets of radial passages 60a and 60b in axially spaced relation and instead of the axially spaced radial passages 62, 64 from the axial passage 56 which are located in the stem and neck respectively there are two axially spaced sets of passages 62a, 64a, extending from the passage 56 both sets being located in the stem. When the head is at the distal end of the chamber 14 FIG. 3 passages 60a and 60b are situated between the sealing rings 42, 44 so that the port 18 and chamber 12 are disconnected from the atmosphere. At the same time the ports 62a and 64a straddle the sealing ring 44 at the proximal ends of the chambers so that the port 20 and the chamber 14 are connected to the portion of the chamber 12 between the sealing rings 42, 44 and hence with the port 18. As shown in FIG. 4 when the piston 26 is shifted by applying pressure to the distal end of the chamber 14 through the port 22 to a position of engagement of the neck 32 with the ring 52 on the shoulder 16 the passages 60a and 60b straddle the sealing ring 42 at the distal end of the chamber 12 thus connecting the port 18 and chamber 12 to the atmosphere. At the same time the ports 62a and 64a are both in communication with that part of the stem situated between the sealing rings 42 and 44 thus blocking communication between the port 20, chamber 14 and the chamber 12.

The two valves A and B in conjunction may be used to provide for shifting pressure in a pressurized system from one activity to another and for this purpose as are herein illustrated are interconnected with each other and with a pilot valve C, FIG. 5. Pilot valve C has a stem 72 and its position is controlled by a diaphragm D to which is fixed a post 70 movable by the diaphragm into and out of engagement with the stem. In the extended position of the stem 72 the pilot valve is deactuated and this occurs at a pressure below approximately 5 pounds per square inch. In the depressed position of the stem 72 the pilot valve is actuated and this occurs at a pressure of above approximately 5 pounds per square inch. The diaphragm may be responsive to expansion or contraction of a volatile fluid capsulated in a bulb and hence to temperature changes in the system or to direct changes in pressure in the system.

In the system shown in FIG. 5 a conductor CO supplies pressure from a suitable source to a nipple 74 screwed into the pilot valve C. Intermediate the ends of the conductor CO there are branch conductors C1 and C2 connected respectively to the nipple 20a of the valve A and the nipple 20a of the valve B. A conductor C3 is connected at one end to a nipple 76 screwed into the pilot valve and at its opposite end to the nipple 22a of the valve A. A conductor C4 connects the nipple 18a of the valve A to an activity T1 and a conductor C5 connects the nipple 22a of valve B to the conductor C4. A conductor C6 connects the nipple 18a of valve B to an activity T2.

When the post 70 is disengaged from the stem 72 the two pistons are in the positions shown in FIGS. 1 and 3 with their heads at the distal ends of the chambers 14 which is the deactivated position of the pilot valve C. In the deactivated pilot of the pilot valve C the valve A is normally closed and the valve B is normally open. In this position the pressure in the conductor CO from the source is blocked at the pilot valve since the pilot valve is closed. Pressure is also blocked through the valve A since the passages 62 and 64 are both located with the chamber 14 and the passage 60 is open to the atmosphere. Pressure is permitted to flow through the valve B at this time through the passages 62a and 64a which straddle the sealing ring 44 thus placing the chamber 14 in communication with the chamber 12 and connecting the chamber 12 through the port 18 and conductor C6 to the activity T2. The passages 60a and 60b are closed. When the pilot valve C is activated pressure supplied from the source through the conductor CO and the conductor C3 to the distal end of the chamber 14 of valve A shift the piston 26 therein to the proximal end of the chamber 14 as shown in FIG. 2 whereupon pressure is permitted to flow through the valve A and conductor C4 to activity T1 the passage 60 of valve A being closed. Simultaneously, pressure is blocked through the valve B since the passages 62a and 64a are located between the sealing rings 42 and 44 and so pressure is cut off to the activity T1.

The activities T1, T2 may be refrigerator compartments to which pressurized fluid is alternately delivered or valve V1 V2 to the refrigerator chambers provided to control flow from the source to the refrigerator compartments.

I claim:

1. A valve assembly comprising a valve block containing axially disposed chambers with an annular shoulder at the proximal ends of the chambers, the distal end of one chamber being closed and the other open, two ports one adjacent the distal end and the other adjacent the proximal end of said one chamber, a port intermediate the proximal and distal ends of the other chamber, a piston supported in said chambers for axial movement relative to said ports, said piston embodying a stem occupying said other chamber and extending therefrom into the one chamber and a head at the end of the stem situated in the one chamber said head in conjunction with the wall of said one chamber, confining between it and the distal end of the one chamber pressure fluid supplied to said one chamber through the port at its distal end and axially spaced passages in the stem so located that when said head engages the distal end of said one chamber one of the passages is situated opposite the port at the proximal end of said one chamber and the other of the passages is situated opposite the port intermediate the ends of said other chamber and connects the latter to the atmosphere.

2. A valve assembly according to claim 1 wherein the stem is of smaller diameter than said other chamber and there are axially spaced sealing rings situated between the wall of said other chamber and the stem at opposite sides of the port in said chamber, and said passages are located in the stem so that when the piston is moved away from the distal end of said one chamber one of said passages will connect the proximal end of said one chamber with that portion of the other chamber situated between said rings and the other of the passages will be disabled.

3. A valve assembly according to claim 1 wherein said other chamber has at its ends annular grooves, within which the sealing rings are disposed around the stem and keeper plates are secured to the ends of said chamber over said grooves against said sealing rings.

4. A valve assembly according to claim 1 wherein said head is frustoconical, the smaller end being next to the distal end of said one chamber and a limit pin is fixed to the smaller end of the head for engagement with the distal end of said one chamber to hold said head at a predetermined distance from said end such that the port therein is always in communication with the smaller end of the head.

5. A valve assembly according to claim 1 wherein the piston has at the side of the head confronting the proximal end of said one cylinder a cylindrical part of smaller diameter than the head and larger diameter than the stem which part forms in conjunction with the stem a shoulder adapted by engagement with the proximal end of said one chamber to limit movement of the piston in that direction and one of said passages has an end located in said cylindrical part and another in the stem at an axially spaced distance such that when said shoulder is in engagement with the proximal end of said one chamber one end will be in communication with the port at the proximal end of said one chamber and the other with a portion of said other chamber located between its distal and proximal ends.

6. A valve assembly according to claim 2 wherein the other of said passages is in the peripheral surface of the stem and is so located therein that when the piston is in its limited position it will be situated beyond the sealing ring at the distal end of said other chamber.

7. A valve assembly according to claim 1 wherein the other of the passages has two branches, which are located in the peripheral surface of the stem in axially spaced relation so that when one of the branches in the peripheral surface is beyond the sealing ring, the other is within the sealing ring.

8. A circuit for controlling delivery of fluid under pressure from a source alternately from one to the other of two facilities comprising a pilot valve embodying inlet and discharge ports through which said fluid under pressure is adapted to be passed by actuation of the pilot valve and to be blocked by deactivation of the pilot valve, a pair of switching valves containing pistons having normally closed and normally open positions respectively, means connecting the switching valves in said circuit with the pilot valve and with a source of pressure so that when the pilot valve is deactivated the pistons in the two valves are respectively, one in a normally closed and the other in a normally open position so that pressure fluid is prevented from flowing through the one valve and is permitted to flow through the other valve to one of the facilities and when the pilot valve is actuated, the pistons are moved to a position wherein the one valve is open and the other closed so that pressure fluid is permitted to flow through the one valve to the other facility and prevented from flowing through the other valve to the one facility, means connecting the discharge port of the pilot valve to the one valve to enable shifting the piston therein from the normally closed position to the open position and means connecting the one valve to the other valve to cause the one valve when the piston therein is moved to its open position to effect movement of the piston in the other valve from its open position to terminate flow of fluid to the one activity.

9. A pressurized circuit according to claim 8, wherein the activities are refrigeration chambers.

10. A pressurized circuit according to claim 8, wherein the activities are valves for controlling the flow of fluid.

11. A valve assembly according to claim 1, wherein there are three ports in said one chamber, two side by side adjacent the proximal end of said one chamber and one adjacent the distal end of said one chamber, said two ports providing access to said one chamber independently or in conjunction.